2 Sheets--Sheet 1.

W. F. COCHRANE.

Machine for Bolting Flour.

No. 6,595. Reissued Aug. 17, 1875.

Attest:
A. Ruppert.
R. Mason

Inventor:
Wm. F. Cochrane

W. F. COCHRANE.

Machine for Bolting Flour.

No. 6,595.

Reissued Aug. 17, 1875.

Attest:
A. Ruppert.
R. Mason

Inventor:
Wm. F. Cochrane

UNITED STATES PATENT OFFICE.

WILLIAM F. COCHRANE, OF LA FAYETTE, INDIANA, ASSIGNOR, BY MESNE ASSIGNMENTS, TO HIMSELF, RODNEY MASON, AND WILLIAM WARDER.

IMPROVEMENT IN MACHINES FOR BOLTING FLOUR.

Specification forming part of Letters Patent No. 37,321, dated January 6, 1863; reissue No. 6,029, dated August 25, 1874; reissue No. 6,595, dated August 17, 1875; application filed August 11, 1875.

DIVISION B.

*To all whom it may concern:*

Be it known that I, WILLIAM F. COCHRANE, of La Fayette, in the county of Tippecanoe and State of Indiana, late of Springfield, in the county of Clarke and State of Ohio, have invented new and useful Improvements in Machines for Bolting Flour; and I do hereby declare that the following is a full, clear, and exact description of the same, reference being had to the annexed drawing, making part of this specification, in which—

Figure 1:
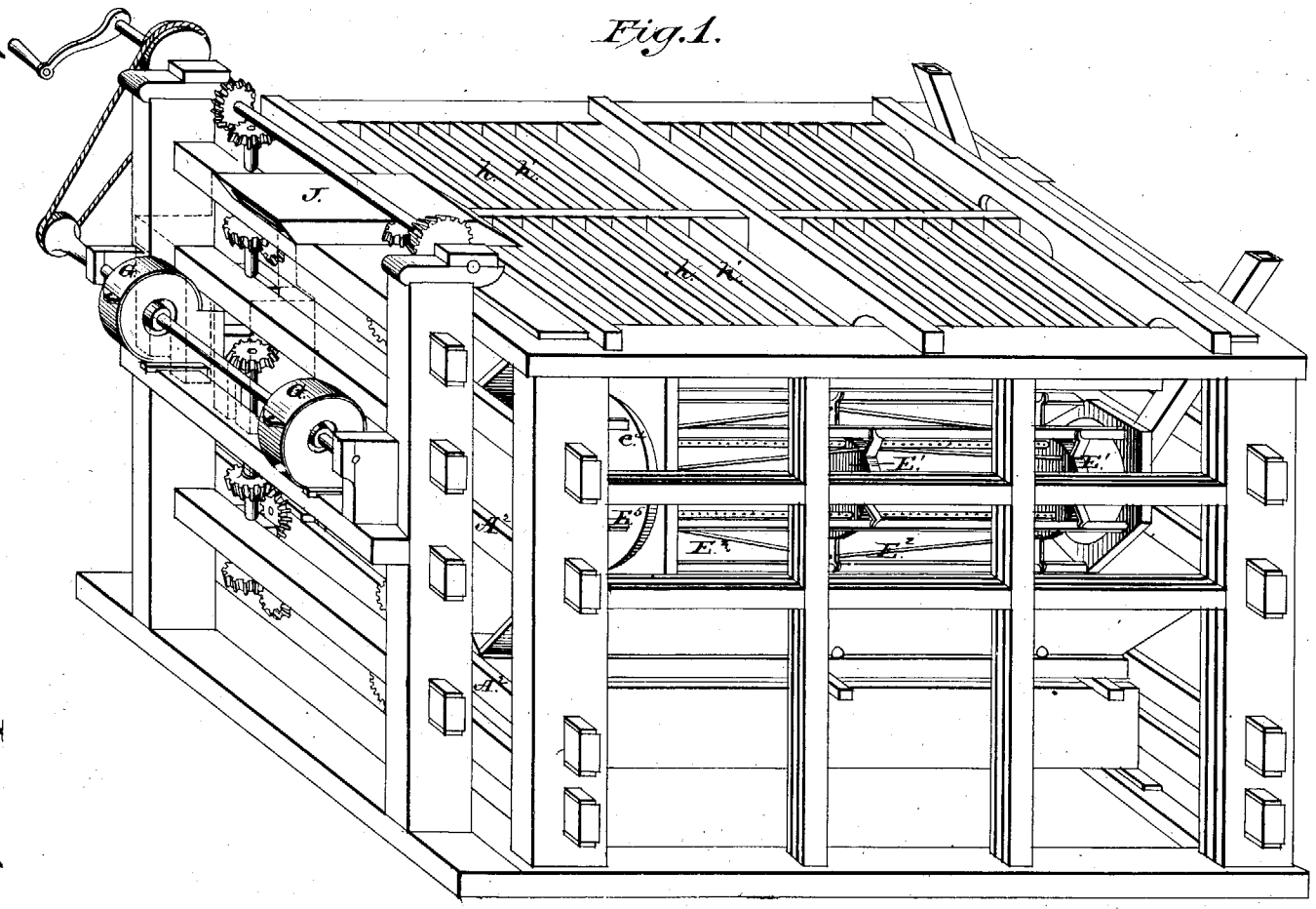
Figure 2:
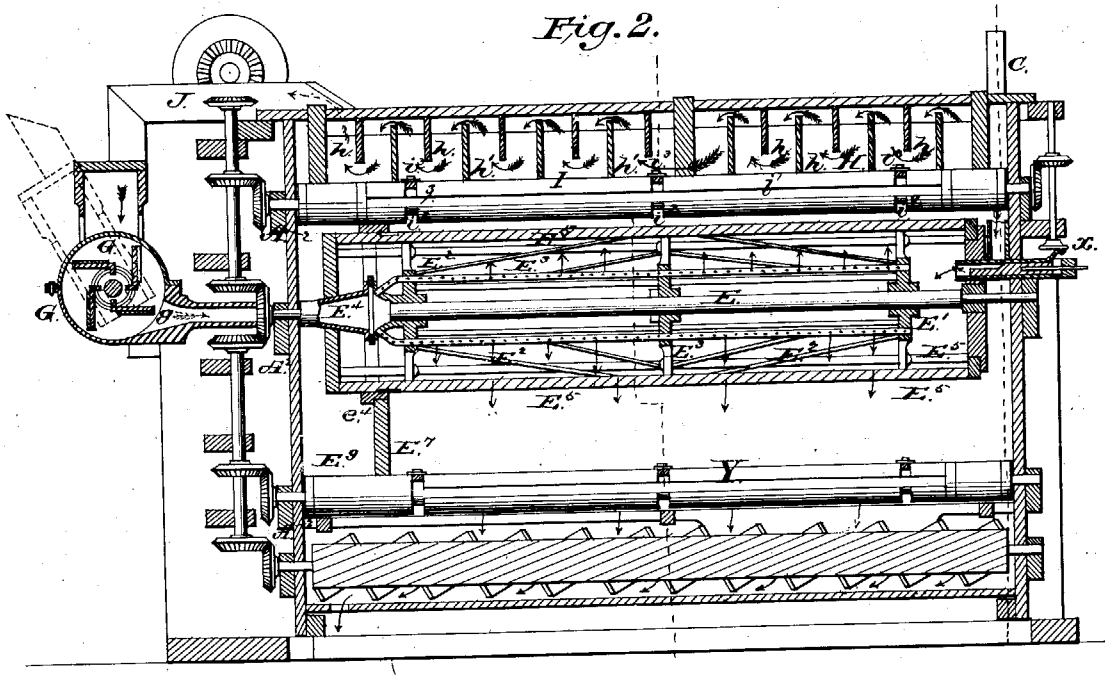

Figure 1 is a perspective view with the panels removed to show the interior structure, and Fig. 2 is a vertical longitudinal section.

In manufacturing flour heretofore screens or bolts have been employed, consisting of a frame covered with a reticulated cloth of wire or threads of silk, the latter being covered with a gum for the purpose of making the thread firm, and thus maintaining the uniformity of the interstices; but, as the heat and vapor evolved in the operation of grinding the grain into meal tends to soften this gum, it has been a frequent source of embarrassment to the miller that his cloths become "clouded" by the adhesion of fine particles of the meal, so that resort has been had to brushes and currents of atmospheric air for the purpose of keeping the meshes clear.

In the use of atmospheric bolts it is obvious that, if the air is allowed to escape freely, there will be much of the finer portion of the meal carried away by the blast and wasted, and this loss has heretofore prevented the general use of such bolts, notwithstanding the obvious advantages attending such a use of the air.

To avoid this difficulty is the main purpose of my invention, as illustrated in this case, and in other patents founded upon applications simultaneously filed.

To this end the invention embraced in this patent consists in combining with the bolt and blast-pipes a collecting-chamber placed in the air-eduction passages, for causing the deposition of the light particles carried with the current before the final escape of the air. In this case the eduction-pipe opens out of the collecting-chamber, so that the air, before being returned, may be purified by deposition of the heavier particles, which may be returned to the bolting-chest or carried away, according to circumstances, at the will of the operator.

In this connection I wish to state that I do not wish to claim in this patent, broadly, in this combination, all forms of a separation or collecting chamber, as another form of collection-chamber is shown and claimed as an element in a combination in another patent of even date, but merely for a deposit-chamber, in which the separation is made by gravity.

To carry out the objects of my invention in the most perfect manner, I have found it necessary to remodel almost entirely the bolting-chests heretofore used. I construct the frame of the bolting-chest of stout timbers, united by mortises and tenons, and held together by screws or bolts in such manner as to admit of their being readily taken apart or put together again. Above the chest I construct a chamber extending the whole length of the frame. This chamber is divided into numerous cells or compartments by means of transverse partitions, having alternately open spaces at top and bottom.

As the air escapes from the reel it enters this chamber and passes through each of the cells, being alternately deflected upward and downward by the partitions, in order that the fine flour carried off from the reel-chamber by the blast may be deposited. A pump or valve in the bottom of the chamber discharges the fine flour thus deposited either directly into a trough or into the reel-chamber, without in either case permitting the return or escape of the blast through the valve.

In the accompanying drawings, which represent a convenient arrangement of parts for carrying out the objects of my invention, my improvements are shown as applied to a bolting-chest consisting of two reels arranged side by side.

As the construction is the same in both, a description of one will be sufficient.

The reel, in this instance, extends the whole length of the chest, and turns freely in bearings in the bridge-trees $A^2$. The central shaft E, upon which the reel is supported, is solid, except at the end nearest the driving-gear, which end is hollow and bell-shaped inside the bearing. Heads or spiders $E^1$ are arranged upon the shaft E at right angles thereto, and are firmly braced and united by tie-rods $E^2$. A series of perforated tubes are arranged around the central shaft. These tubes $E^3$, in this instance, are open at one end only, these open ends being inserted into the bell-mouth $E^4$. The bolting-cloths are secured to ribs $E^5$, inserted into slots in the reel-arms $E^1$.

Air is supplied to the reel in the following manner: The end of the reel-shaft nearest the driving-gear is hollow, and forms a close joint with the end of an air-tube, Q, leading from a fan, G; the shaft revolves freely, but the air-tube is stationary. The reel-chamber is divided into two compartments of unequal size, by a partition $E^7$, which encircles the reel, and fits snugly in a flanged wing, $e^4$, upon it. The larger of these two compartments is for the reception of the fine flour which passes through the bolting-cloths, while the smaller one forms a dead-air chamber, $E^9$, into which the tailings or offal falls, a portion of the tail end of the reel being left open for that purpose.

The collecting-chamber H is divided into a number of compartments or cells by means of the transverse partitions *h h'*. The partitions *h* fit closely to the top of the chest, but do not extend quite to the bottom of the chamber, while the others, *h'*, are secured to the bottom, but do not reach the top, their lower edges being inserted into grooves in the valve-shaft I. The current of air passes from the bolting-chamber through an opening behind the spout C, which feeds the reel and enters the collecting-chamber, through which it passes, being alternately deflected upward and downward by the partitions *h h'*, thus forming eddies, which cause the flour or dust to settle in the cells upon the valve-shaft I, by which it is discharged.

The valve I, in this instance, consists of a rotating shaft, fitting accurately and turning freely in two concave blocks, whose inner sides are curved to suit it. The shaft I has a long slot cut entirely through it, into which a board, $i^1$, fits. The width of this board is somewhat less than the diameter of the shaft, and it fits closely in the slot, but is free to reciprocate transversely in it. Shallow annular channels or grooves $i^2$ are cut into the shaft at intervals. Brackets $i^3$, curved on their under sides, near their centers, to correspond with the grooves $i^2$, are secured upon the base-boards or concave blocks, and serve to hold the shaft and blocks together, and as a guide or cam to work the reciprocating board or plunger $i^1$. The arrangement of the brackets is such that, when the plunger-board $i^1$ is vertical, a cavity or channel, in which the fine flour is deposited, is left in the upper side of the shaft; but when the shaft revolves the board is pressed down, leaving a similar channel on the upper side, now uppermost, and forcing out the fine flour into a trough or conveyer below, through an opening between the concave blocks. In the present instance, however, for convenience of construction, the fine flour thus collected is dropped by the valve directly into the reel-chamber, where it mingles with the other flour.

After passing the whole length of the collecting-chamber the current of blast air may enter the air-trunk J, which leads to the fan G, and again be returned to the reel, or it may be permitted to escape at once to the open air.

It is deemed unnecessary to describe in detail the construction and operation of the other parts of the mechanism, as they form no part of the subject-matter herein claimed, and are, moreover, fully described in other applications filed simultaneously, and marked, respectively, A, B, C, and D.

What I claim as my invention, and desire to secure by Letters Patent, is—

The combination, in a bolting-chest, of a screen and fan and pipes for directing an atmospheric current through the meshes of the screen, and the collecting or deposit chamber in the air-eduction passage, wherein the deposition of solid particles drawn up by the blast occurs by gravity, substantially as set forth.

In witness whereof I have hereunto set my hand in the presence of two attesting witnesses.

WM. F. COCHRANE.

Subscribed in presence of—
R. MASON,
WM. GARDNER.